US010152653B2

(12) United States Patent
Moroney et al.

(10) Patent No.: US 10,152,653 B2
(45) Date of Patent: Dec. 11, 2018

(54) SPATIAL ANALYSIS WITH ATTRIBUTE GRAPHS

(71) Applicant: Hewlett-Packard Development Company, L.P., Houston, TX (US)

(72) Inventors: Nathan Moroney, Palo Alto, CA (US); Jun Zeng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/500,916

(22) PCT Filed: Jul. 31, 2014

(86) PCT No.: PCT/US2014/049146
§ 371 (c)(1),
(2) Date: Jan. 31, 2017

(87) PCT Pub. No.: WO2016/018367
PCT Pub. Date: Feb. 4, 2016

(65) Prior Publication Data
US 2017/0220902 A1 Aug. 3, 2017

(51) Int. Cl.
*G06K 9/62* (2006.01)
*G06K 9/46* (2006.01)
(Continued)

(52) U.S. Cl.
CPC ......... *G06K 9/6224* (2013.01); *G06K 9/4638* (2013.01); *G06T 7/11* (2017.01); *G06T 7/162* (2017.01)

(58) Field of Classification Search
CPC .......................... G06K 9/6224; G06K 9/4638
See application file for complete search history.

(56) References Cited

U.S. PATENT DOCUMENTS 6,173,075 B1 * 1/2001 Collins .............. G06K 9/00476
382/164
6,208,347 B1 * 3/2001 Migdal ................... G06T 17/20
345/419
(Continued)

FOREIGN PATENT DOCUMENTS

WO WO-2008107859 A1 9/2008

OTHER PUBLICATIONS

Estivill-Castro et al, "AUTOCLUST: Automatic Clustering via Boundary Extraction for Mining Massive Point-Data Sets," 2000, Proc. of the 5th International Conference on Geocomputation, 20 pages.*

(Continued)

*Primary Examiner* — David F Dunphy
(74) *Attorney, Agent, or Firm* — HP Inc. Patent Department

(57) ABSTRACT

Examples relate to providing spatial analysis using attribute graphs. In one examples, there are a number of spatial points that each represent characteristics in a dimensional space. Non-data points are generated in the dimensional space, and a Delaunay triangulation is performed using the spatial points and the non-data points to generate a plurality of edges, where interior points of the plurality of non-data points that are in an interior space of the plurality of spatial points are excluded from the Delaunay triangulation. Next, spatial edges from the plurality of edges that each connect a spatial point that is connected to a first mixed edge to another spatial point that is connected to a second mixed edge are identified, where the spatial edges are used to generate a robust contour of a cluster of the spatial points.

20 Claims, 5 Drawing Sheets

(51) Int. Cl.
    *G06T 7/11*         (2017.01)
    *G06T 7/162*      (2017.01)

(56) References Cited

U.S. PATENT DOCUMENTS

| | | | |
|---|---|---|---|
| 8,730,235 B2* | 5/2014 | Thompson, II | G06T 17/20 |
| | | | 345/423 |
| 2005/0231392 A1 | 10/2005 | Meehan et al. | |
| 2009/0043220 A1 | 2/2009 | Montgomery et al. | |
| 2012/0190988 A1* | 7/2012 | Harhen | A61B 1/0051 |
| | | | 600/466 |
| 2013/0185035 A1 | 7/2013 | Andrade et al. | |
| 2014/0152869 A1 | 6/2014 | Solotko | |
| 2014/0355844 A1* | 12/2014 | Menini | G06T 11/006 |
| | | | 382/121 |
| 2015/0260017 A1* | 9/2015 | Ding | E21B 43/00 |
| | | | 703/10 |

OTHER PUBLICATIONS

Bailey-Kellogg, C et al, "Qualitative Spatial Reasoning Extracting and Reasoning with Spatial Aggregates", Nov. 26, 2003.
Dongquan, Liu et al, "Effective clustering and boundary detection algorithm based on Delaunay Triangulation", Jul. 2008.
McCreary, C.L. et al, "Using Graph Parsing for Automatic Graph Drawing", Apr. 4, 2007.
Vladimir Estivill-Castro et al, "AUTOCLUST: Automatic clustering via boundary extraction for mining massive . . . , Proc. of the 5th Int'l Conf on Geocomputation", 2000.
Waghmare, V.N. et al, "Convex Hull Using K-means Clustering in Hybrid (MPI/OpenMP) Environment", Nov. 2010.

* cited by examiner

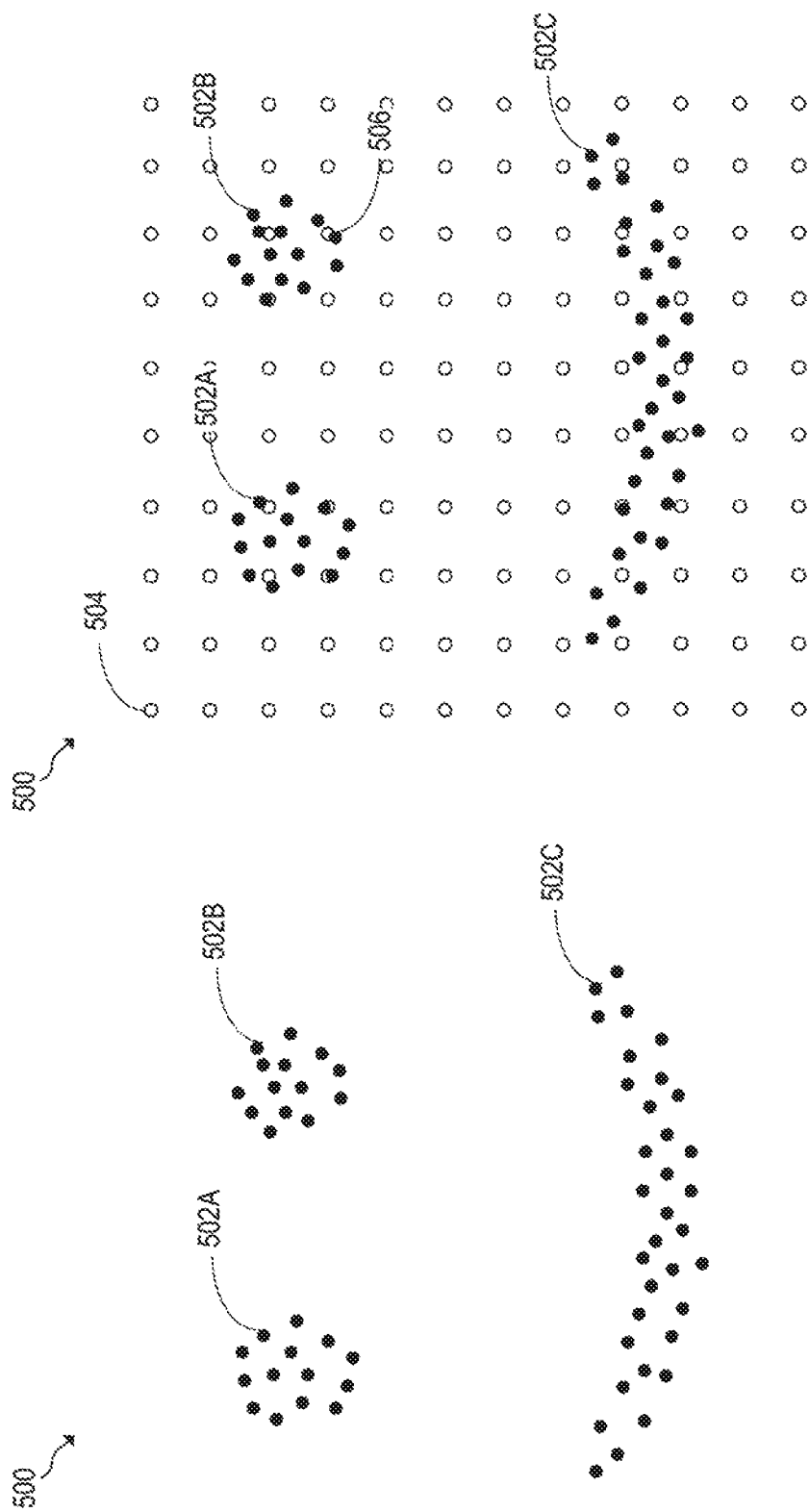

SPATIAL ANALYSIS WITH ATTRIBUTE GRAPHS

BACKGROUND

Clustering, robust statistics, geometric processing and graph processing are commonly used to analyze spatial data points. For example, k-means clustering can be applied to color dusters to derive color palettes, to extrapolate color using the median matrix, to apply a computer vision algorithm for fitting of geometric primitives, and to perform a graph formulation of color categories. The color clustering assumes uniform, symmetric distributions and that competing methods of computing k are sub-optimal. The color extrapolation may use a variant of a Theil-Sen estimator. The geometric primitives technique may be ineffective at processing complex contours. Finally, the results from color categorization networks show the power and expressiveness of graph formulations of data with a spatial interpretation.

BRIEF DESCRIPTION OF THE DRAWINGS

The following detailed description references the drawings, wherein:

FIG. 5A is an example dimensional space showing spatial data;

FIG. 5B is an example dimensional space showing spatial data and non-data; and

DETAILED DESCRIPTION

Figure 1:
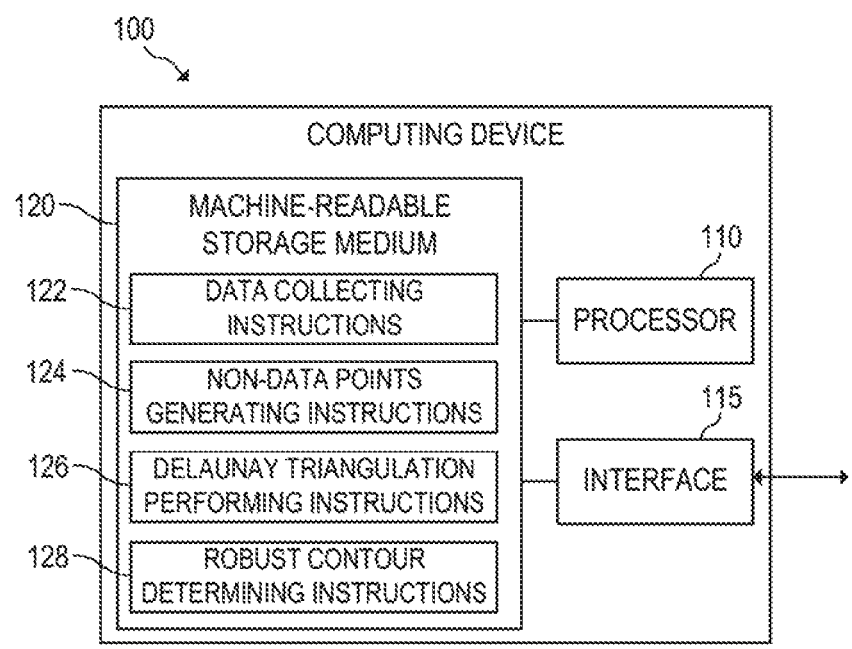
FIG. 1 is a block diagram of an example computing device for spatial analysis with attribute graphs.

As detailed above, various techniques for analyzing spatial data points can be used to estimate duster boundaries. Classical approaches like k-means use assumptions, such as mostly uniform distributions, and additional computations, such as estimation of k or the number of dusters. More complex algorithms use data density or other measures but are generally more complex and also include some assumptions about the data. Computational geometry techniques, such as convex hull algorithms, are used in various computer vision applications to estimate an outer convex boundary.

Examples herein describe a spatial analysis scheme that with minimal assumptions is capable of clustering data with convex and concave features and providing an intuitive technique to estimate the number of dusters. The spatial analysis scheme add non-data points (i.e., aether) to the dataset before computing a Delaunay triangulation, which results is an attributed relational graph (i.e., attribute graph) in which points have spatial positions and are classified as either aether or data. At this stage, edges can be determined through the spatial positions of the points and are classified with a logical operator using the connecting points. A non-data edge connects two non-data points, a spatial edge connects two spatial points, and a mixed edge connects a spatial point and a non-data point. Logical operations can be performed using the edges of the triangular mesh to identify mixed edges that include a spatial point that is further connected to another spatial point, where the mixed edges are used to an exterior contour.

Numerous refinements and variations of the spatial analysis scheme are described below. In some cases, the non-data points can be constructed using a uniform geometric sampling scheme or a void-filling data-approaching scheme. Further, the attribute graph can be extended to additional properties such as length, area, or angular span. Likewise the tessellation mesh can be post-processed in manner similar to convex hull peeling such that the number of clusters extracted is a function of minimum area thresholding.

Examples disclosed herein provide spatial analysis with attribute graphs. For example, in some cases, there are a number of spatial points that each represent characteristics in a dimensional space. Non-data points are generated in the dimensional space, and a Delaunay triangulation is performed using the spatial points and the non-data points to generate a plurality of edges, where interior points of the plurality of non-data points that are in an interior space of the plurality of spatial points are excluded from the Delaunay triangulation. Next, spatial edges from the plurality of edges that each connect a spatial point that is connected to a first mixed edge to another spatial point that is connected to a second mixed edge are identified, where the spatial edges are used to generate a robust contour of a cluster of the spatial points.

In this manner, examples disclosed herein provided spatial analysis with attribute graphs by using non-data points when performing a Delaunay triangulation. Specifically, by using non-data points, mixed edges can be identified during the Delaunay triangulation and then used to determine a robust contour for data clusters. Applications of such techniques include data clustering for machine learning, image segmentation, object reconstruction, and three-dimensional print processing.

Referring now to the drawings, FIG. 1 is a block diagram of an example computing device 100 for spatial analysis with attribute graphs. Computing device 100 may be any computing device (e.g., desktop computer, laptop computer, server, tablet device, etc.) capable of accessing spatial data. In FIG. 1, computing device 100 includes a processor 110, an interface 115, and a machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to enable spatial analysis with attribute graphs, as described below. As an alternative or in addition to retrieving and executing instructions, processor 110 may include one or more electronic circuits comprising a number of electronic components for performing the functionality of one or more of instructions 122, 124, 126, 128.

Interface 115 may include a number of electronic components for communicating with sensors. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with a spatial dataset. Alternatively, interface 115 may be a wireless interface, such as a wireless local area network (WLAN) interface or a near-field communication (NFC) interface. In operation, as detailed below, interface 115 may be used to send and receive data to and from a corresponding interface of sensors.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for spatial analysis with attribute graphs.

Data collecting instructions 122 may access a spatial dataset and related data. The spatial dataset includes spatial points, which describe various attributes in a dimensional space. Specifically, spatial points may refer to coordinates in a two-dimensional or three-dimensional space, where each axis of the dimensional space are associated with attribute. For example, the spatial points may correspond to RGB values in a three-dimensional space. In another example, the spatial points may correspond to points of interest in a digital image. In yet another example, the spatial points may correspond to locations on a geographic map.

Non-data points generating instructions 124 may generate non-data points in the dimensional space of the spatial dataset. The non-data points can correspond to vertices/intersection of a geometric object that is evenly distributed throughout the dimensional space (I.e., geometric packing) such as a square grid, a rectangular grid, a hexagonal grid, a spherical grid with overlap, etc. The non-data points may be iteratively generated within bounds of the dimensional space.

Delaunay triangulation performing instructions 126 may perform a Delaunay triangulation on the spatial and non-data points. In two-dimensional space, the Delaunay triangulation creates edges of triangles between the spatial points and non-data points such that the circumcircle of any resulting triangle does not include a point that isn't a vertex of the triangle. Delaunay triangulation can be extended to a three-dimensional space by considering circumscribed spheres. As noted above, a non-data edge connects two non-data points, a spatial edge connects two spatial points, and a mixed edge connects a spatial point and a non-data point.

Robust contour determining instructions 128 uses the edges resulting from the Delaunay triangulation to determine a robust contour for clusters of spatial points. A duster of spatial points may be a subset of the spatial points that are vertices of adjacent triangles formed by the Delaunay triangulation. A robust contour for a cluster may be composed of spatial edges, where each spatial point of each spatial edge is also connected to a mixed edge. In other words, the robust contour is defined by spatial edges that occur at the edges of the duster of spatial points.

A robust contour exhibits a good approximation of a composite shape for a duster of spatial data with a wide range of probability distributions. Accordingly, robust contours can be resistant to distortion caused by outliers.

Figure 2:
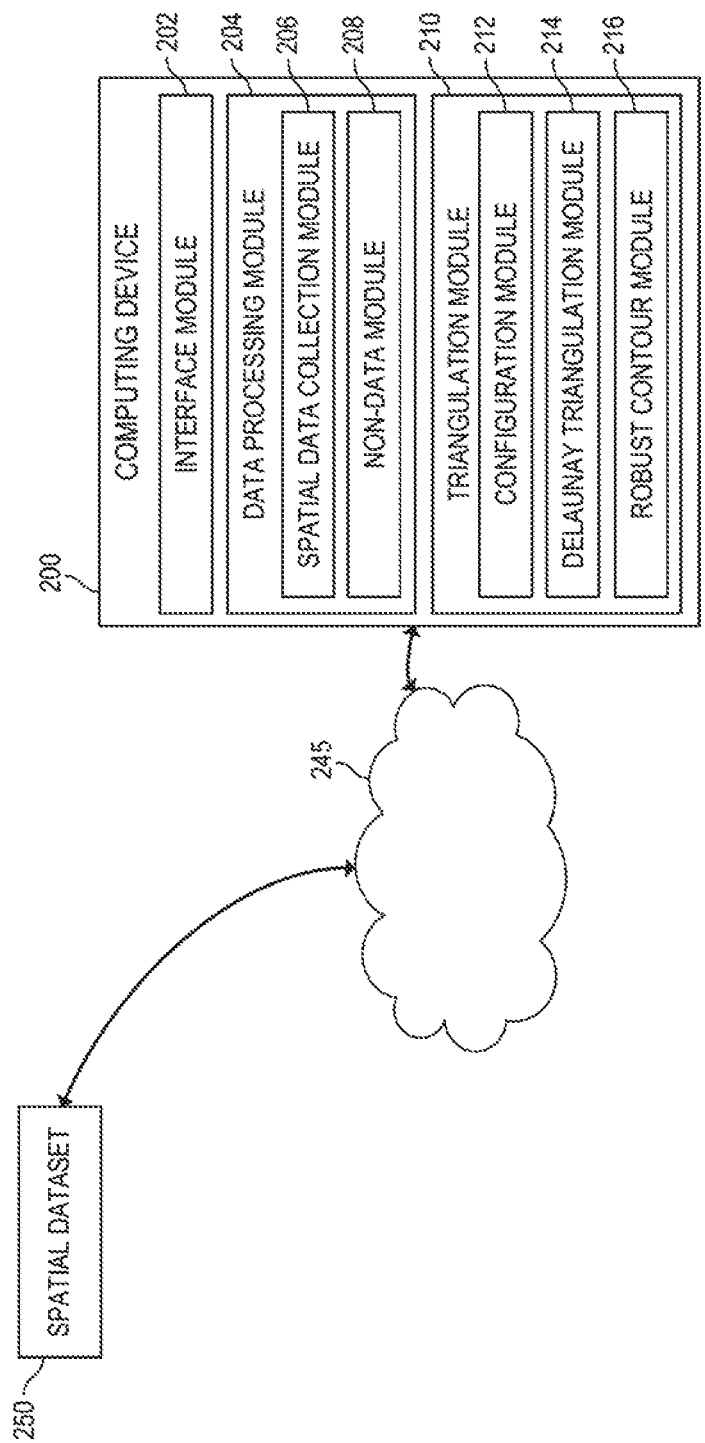
FIG. 2 is a block diagram of an example computing device in communication with a spatial dataset for spatial analysis with attribute graphs.

FIG. 2 is a block diagram of an example computing device 200 in communication via a network 245 with spatial dataset 250. As illustrated in FIG. 2 and described below, computing device 200 may communicate with spatial dataset 250 to provide spatial analysis with attribute graphs.

As illustrated, computing device 200 may include a number of modules 202-216. Each of the modules may include a series of instructions encoded on a machine-readable storage medium and executable by a processor of the computing device 200. In addition or as an alternative, each module may include one or more hardware devices including electronic circuitry for implementing the functionality described below.

As with computing device 100 of FIG. 1, computing device 200 may be a notebook, desktop, server, tablet, workstation, mobile device, or any other device suitable for executing the functionality described below. As detailed below, computing device 200 may include a series of modules 202-216 for spatial analysis with attribute graphs.

Interface module 202 may manage communications with spatial dataset 250. Specifically, the interface module 202 may initiate connections with spatial dataset 250 and receive spatial data and related data from spatial dataset 250.

Data processing module 204 may manage spatial data obtained from spatial dataset 250 and other sources. Although the components of data processing module 204 are described in detail below, additional details regarding an example implementation of module 204 are provided above in connection with instructions 122 and 124 of FIG. 1.

Spatial data collection module 206 may collect and process spatial data from spatial dataset 250. Specifically, spatial points describing attributes in a dimensional space can be collected from spatial dataset 250. Further, data collection module 206 can also obtain metadata that is associated with the spatial points such as the bounds of the dimensional space, a coordinate system of the dimensional space, descriptions of the attributes, a rendering style for the spatial points (e.g., color ramp based on data values, etc.), etc.

Non-data module 208 may generate non-data points for use in a Delaunay triangulation. The non-data points may correspond to vertices/Intersection of a geometric object that is evenly distributed throughout the dimensional space (e.g., a square grid, a rectangular grid, a hexagonal grid, a spherical grid with overlap, etc.). The non-data points can be generated using the spatial data, such as the bounds of the dimensional space, obtained by spatial data collection module 206. For example, the non-data points by dividing the bounds of each dimension of the dimension space by a preconfigured parameter so that a grid of points can be iteratively generated in the dimensional space.

Triangulation module 210 may manage triangulations that are performed using the spatial data and the non-data. Although the components of triangulation module 210 are described in detail below, additional details regarding an example implementation of module 210 are provided above in connection with instructions 126 and 128 of FIG. 1.

Configuration module 212 may allow a user of computing device 200 to specify various triangulation parameters. For example, configuration module 212 may allow the user to specify the coarseness a grid formed by the non-data points generated by non-data module 208. In this example, a grid that is configured to be less coarse typically results in more spatial points being considered for a resulting robust contour. In another example, configuration module 212 may allow the user to specify the type of grid (e.g., rectangular, hexagonal, spherical, etc.) that should be generated by non-data module 208. In these examples, the coarseness of the grid affects an analysis duration of a Delaunay triangulation performed on the data (i.e., a coarser grid results in a Delaunay triangulation that can be performed faster or that can preview or handle larger amounts of data).

Delaunay triangulation module 214 may perform Delaunay triangulations using spatial data and non-data provided by data processing module 204. Initially, Delaunay triangulation module 214 may determine non-data points to exclude from further analysis. The non-data points to exclude occur within an interior space of clusters of the spatial data. For example, a duster of spatial points in a two-dimensional space can be used to generate a polygon, where any non-data points that intersect the polygon are excluded from further analysis. After the identified points are excluded, Delaunay triangulations can be performed for each duster of spatial points and neighboring non-data points. The Delaunay triangulation results in non-data edges, spatial edges, and mixed edges such as the edges described below with respect to FIG. 5C. In some cases, Delaunay triangulations can be performed for multiple coarseness parameters to generate multiple results for use by robust contour module 216.

Robust contour module 216 may use the results of Delaunay triangulation module 216 to determine a robust contour for each duster of spatial points. Specifically, robust contour module 216 identifies edges satisfying particular characteristics to be considered for inclusion in robust contours. For example, spatial edges where each edge is connected to a non-data point can be identified for inclusion in robust contours. In some cases, robust contour module 216 generate a composite robust contour based on multiple results for varying coarseness parameters. After the robust contours are determined, the robust contours can be used to perform various analysis of the spatial or related data. A centroid of the robust contour can be used to determine a representative value of spatial data for the corresponding duster of spatial points. In another example, the robust contour is used to calculate an area of the corresponding duster of spatial data.

Spatial dataset 250 may be provided a hardware storage device for maintaining data accessible to computing device 200. For example, the storage device may include one or more hard disk drives, solid state drives, tape drives, and/or any other storage devices. In some cases rather than accessing spatial dataset 250 via network 245, the storage device may be located in computing device 200.

Figure 3:
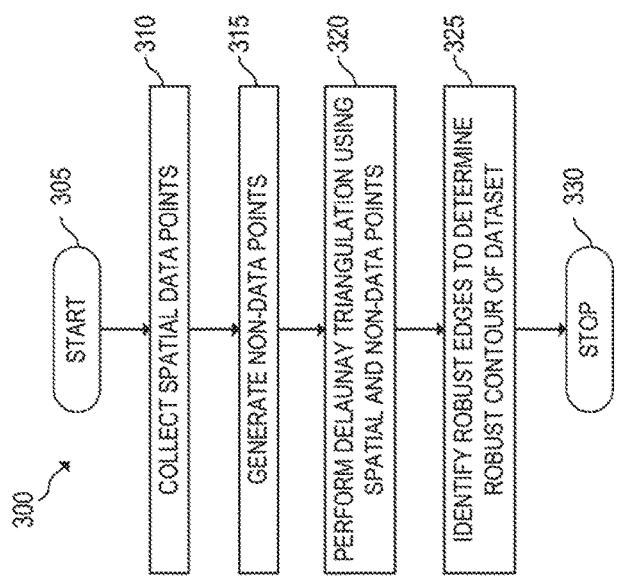
FIG. 3 is a flowchart of an example method for execution by a computing device for spatial analysis with attribute graphs.

FIG. 3 is a flowchart of an example method 300 for execution by a computing device 100 for spatial analysis with attribute graphs. Although execution of method 300 is described below with reference to computing device 100 of FIG. 1, other suitable devices for execution of method 300 may be used, such as computing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where computing device 100 may collect spatial data points that describe various attributes in a dimensional space. In block 315, non-data points are generated in the dimensional space of the spatial points. For example, the non-data points may be a square grid of evenly distributed points.

In block 320, a Delaunay triangulation is performed on the spatial and non-data points. In this example, the Delaunay triangulation creates edges of triangles between the spatial points and non-data points such that the circumcircle of any resulting triangle does not include a point that isn't a vertex of the triangle. In block 325, computing device 100 uses the edges resulting from the Delaunay triangulation to determine a robust contour for clusters of spatial points. A robust contour for a cluster may be composed of spatial edges, where each spatial point of each spatial edge is also connected to a mixed edge. Method 300 may then continue to block 330, where method 300 may stop.

Figure 4:
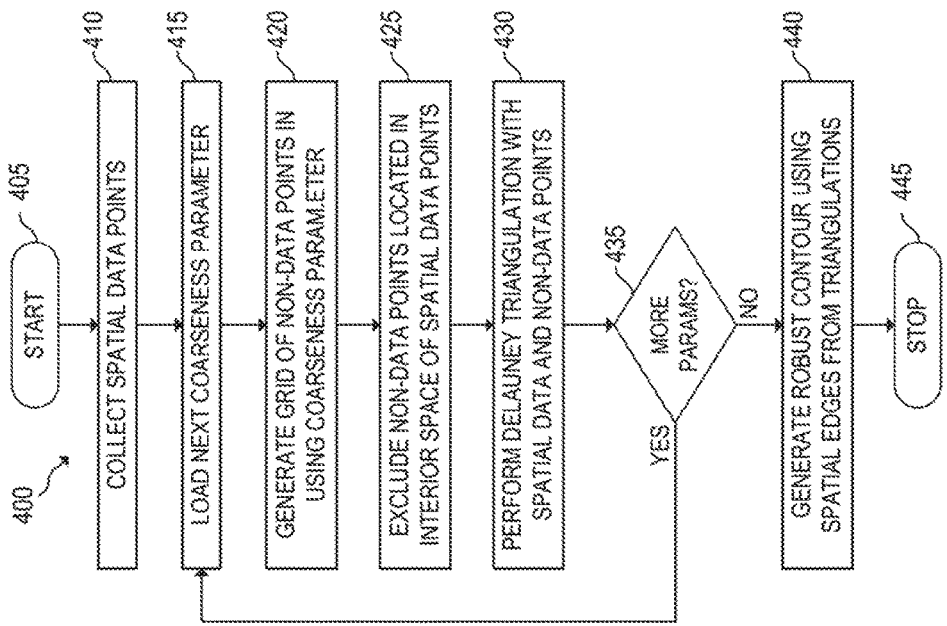
FIG. 4 is a flowchart of an example method for execution by a computing device for composite spatial analysis with attribute graphs.

FIG. 4 is a flowchart of an example method 400 for execution by a computing device 200 for composite spatial analysis with attribute graphs. Although execution of method 400 is described below with reference to computing device 200 of FIG. 2, other suitable devices for execution of method 400 may be used, such as computing device 200 of FIG. 1. Method 400 may be implemented in the form of executable instructions stored on a machine-readable storage medium and/or in the form of electronic circuitry.

Method 400 may start in block 405 and continue to block 410, where computing device 200 may collect spatial data points that describe various attributes in a dimensional space. In block 415, the next coarseness parameter to be used when performing a Delaunay triangulation is loaded. Specifically, a sequence of coarseness parameters may be configured for sequential use in generating non-data points for the Delaunay triangulation. In block 420, non-data points are generated in the dimensional space using the loaded coarseness parameter.

In block 425, non-data points occurring in the interior of clusters of spatial data are excluded from further analysis. Excluding the identified non-data points ensures that spatial edges can be more easily identified as described below. In block 430, a Delaunay triangulation is performed on the spatial points and non-data points that were not excluded. In block 435, computing device 200 determines if there are additional coarseness parameters. If there are additional coarseness parameters, method 400 returns to block 415 to use the next coarseness parameter as described above. If there are no additional coarseness parameters, a composite robust contour can be generated using the spatial edges generated above in block 440. Specifically, the spatial edges for each coarseness parameter where each spatial point is connected to a non-data point are used to generate a composite robust contour. For example, spatial edges can be selected for each coarseness parameter to generate the composite contour. In another example, the composite contour can be a spatial average of the different robust contours generated for the coarseness parameters. Method 400 may then continue to block 445, where method 400 may stop.

FIG. 5A is example dimensional space 500 showing spatial data. The dimensional space 500 allows for dusters of spatial points 502A, 502B, 502C to be spatially represented. Dimensional space 500 is two-dimensional and includes two axis (not shown), each of which represents a characteristic of each spatial point. In this example, the characteristics may be related to the positioning of objects in an underlying photograph or picture. Specifically, the spatial points in each duster 502A, 502B, 502C may represent locations in the underlying photograph or picture that have a similar color. 502A and 502B appear to represent eyes while 502C appears to represent a mouth.

FIG. 5B is an example dimensional space 500 showing spatial data and non-data. Dimensional space 500 shows dusters of spatial points 502A, 502B, 502C and non-data points 504, 506. In this example, non-data points 504, 506 are evenly distributed in a square grid according to the bounds of dimensional space 500. The non-data points 504, 506 may be generated by iteratively dividing the dimensional space 500 according to a coarseness parameter. Non-data point 506 is interior to duster of spatial points 502B such that non-data point 506 would be excluded from a Delaunay triangulation.

Figure 5C:
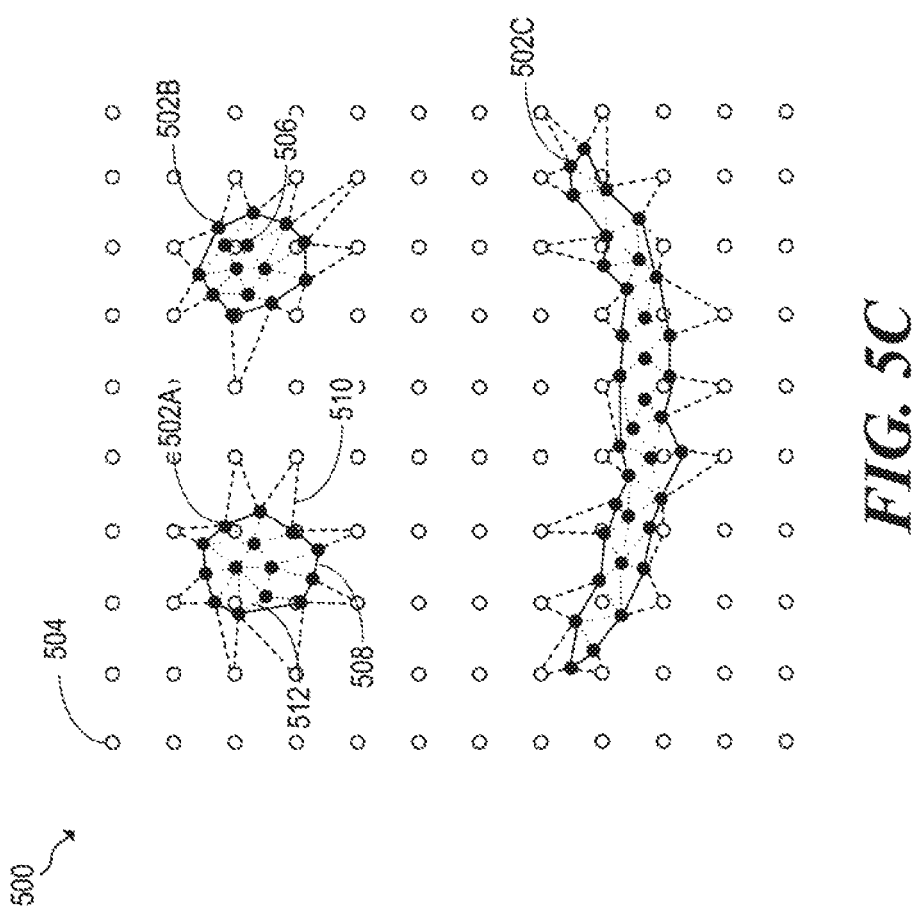
FIG. 5C is an example dimensional space showing spatial data, non-data, and robust contours.

FIG. 5C is an example dimensional space 500 showing spatial data, non-data, and robust contours. Each duster of spatial points 502A, 502B, 502C has been processed to now show spatial edges 508, 512 and mixed edges 510, which are the results of a Delaunay triangulation. Spatial edges 508 have been used to determine a robust contour for each duster of spatial points 502A, 502B, 502C, which shows a smiling face. Each spatial edge 508 in a robust contour is connected to two non-data points via mixed edges.

The foregoing disclosure describes a number of examples for providing spatial analysis using attribute graphs. In this manner, the examples disclosed herein enable robust contours to be determined clustered spatial data by using non-data points with the spatial points when performing a Delaunay triangulation.

We claim:

1. A system for providing spatial analysis using attribute graphs, the system comprising:
   an interface to communicate with a set of sensors that create a spatial dataset of a plurality of spatial points wherein the spatial points represent at least one of RGB values in three-dimensional space, points of interest in a digital image, and locations on a geographic map;
   a storage device to store the plurality of spatial points that each represent characteristics in a dimensional space;
   a processor operatively connected to the storage device, the processor to:
      generate a plurality of non-data points in the dimensional space;
      perform a Delaunay triangulation using the plurality of spatial points and the plurality of non-data points to generate a plurality of edges, wherein interior points of the plurality of non-data points that are in an interior space of the plurality of spatial points are excluded from the Delaunay triangulation;
      identify spatial edges from the plurality of edges that each connect a spatial point that is connected to a first mixed edge to another spatial point that is connected to a second mixed edge, wherein the spatial edges are used to generate a robust contour of a cluster of the plurality of spatial points; and
      estimate an outer boundary with convex and concave features from the robust contour for one of machine learning, image segmentation, object reconstruction, and three-dimensional print processing.

2. The system of claim 1, wherein the plurality of non-data points is a square grid, a rectangular grid, a hexagonal grid, or a spherical grid of points that are uniformly distributed in the dimensional space.

3. The system of claim 2 wherein a user specifies one of the types of grid.

4. The system of claim 2, wherein the uniform distribution of the grid of points is determined using a preconfigured coarseness parameter.

5. The system of claim 4, wherein the preconfigured coarseness parameter is set to a coarser value to decrease an analysis duration of the Delaunay triangulation.

6. The system of claim 4, wherein the Delaunay triangulation is iteratively performed using a plurality of values for the preconfigured coarseness parameter to generate a plurality of robust results, and wherein the robust contour is a composite of the plurality of robust results.

7. The system of claim 1, wherein the processor is further to determine a centroid of the robust contour, wherein the centroid is used to determine a representative value of a characteristic in the cluster of the plurality of spatial points.

8. The system of claim 1 wherein the spatial dataset includes meta data associated with the plurality of spatial points wherein the metadata includes at least one of bounds of the dimensional space, a coordinate system of the dimensional space, descriptions of attributes of the spatial points, and a rendering style for the plurality of spatial points.

9. The system of claim 1 wherein the characteristics of the dimensional space are related to the positioning of objects in an underlying photograph or picture that have a similar color.

10. The system of claim 1 wherein the plurality of non-data points is constructed using at least one of a uniform geometric sampling scheme and a void-filling data-approaching scheme.

11. The system of claim 1, wherein processor creates an estimated a number of clusters and the Delaunay triangulation creates a tessellation mesh and the processor is further to post process the tessellation mesh such that the number of clusters extracted is a function of minimum area thresholding.

12. A method for providing spatial analysis using attribute graphs, the method comprising:
   obtaining from an interface communicating to a set of sensors that create a spatial dataset of a plurality of spatial points that each represent characteristics in a dimensional space, wherein the characteristics include at least one of RGB values in three-dimensional space, points of interest in a digital image, and locations on a geographic map;
   generating a plurality of non-data points using a bounds of the dimensional space, wherein the plurality of non-data points is a square grid, a rectangular grid, a hexagonal grid, or a spherical grid of points that are uniformly distributed in the dimensional space;
   performing a Delaunay triangulation using the plurality of spatial points and the plurality of non-data points to generate a plurality of edges, wherein interior points of the plurality of non-data points that are in an interior space of the plurality of spatial points are excluded from the Delaunay triangulation;
   identifying spatial edges from the plurality of edges that each connect a spatial point that is connected to a first mixed edge to another spatial point that is connected to a second mixed edge, wherein the spatial edges are used to generate a robust contour of a cluster of the plurality of spatial points; and
   estimating an outer boundary with convex and concave features from the robust contour for one of machine learning, image segmentation, object reconstruction, and three-dimensional print processing.

13. The method of claim 12, wherein the uniform distribution of the grid of points is determined using a preconfigured coarseness parameter.

14. The method of claim 13, wherein the preconfigured coarseness parameter is set to a coarser value to decrease an analysis duration of the Delaunay triangulation.

15. The method of claim 13, wherein the Delaunay triangulation is iteratively performed using a plurality of values for the preconfigured coarseness parameter to generate a plurality of robust results, and wherein the robust contour is a composite of the plurality of robust results.

16. The method of claim 12, further comprising determining a centroid of the robust contour, wherein the centroid is used to determine a representative value of a characteristic in the cluster of the plurality of spatial points.

17. A non-transitory machine-readable storage medium encoded with instructions executable by a processor for spatial analysis using attribute graphs, the machine-readable storage medium comprising instructions to:
   obtain from an interface communicating with a set of sensors that create a spatial dataset of a plurality of spatial points that each represent characteristics in a dimensional space, wherein the characteristics include at least one of RGB values in three-dimensional space, points of interest in a digital image, and locations on a geographic map;

generate a plurality of non-data points using a bounds of the dimensional space, wherein the uniform distribution of the grid of points is determined using a preconfigured coarseness parameter;

perform a Delaunay triangulation using the plurality of spatial points and the plurality of non-data points to generate a plurality of edges, wherein interior points of the plurality of non-data points that are in an interior space of the plurality of spatial points are excluded from the Delaunay triangulation;

identify spatial edges from the plurality of edges that each connect a spatial point that is connected to a first mixed edge to another spatial point that is connected to a second mixed edge;

use the spatial edges to generate a robust contour of a cluster of the plurality of spatial points; and estimate an outer boundary with convex and concave features from the robust contour for one of machine learning, image segmentation, object reconstruction, and three-dimensional print processing.

18. The non-transitory machine-readable storage medium of claim 17, wherein the plurality of non-data points is a square grid, a rectangular grid, a hexagonal grid, or a spherical grid of points that are uniformly distributed in the dimensional space.

19. The non-transitory machine-readable storage medium of claim 17, wherein the Delaunay triangulation is iteratively performed using a plurality of values for the preconfigured coarseness parameter to generate a plurality of robust results, and wherein the robust contour is a composite of the plurality of robust results.

20. The non-transitory machine-readable storage medium of claim 17, wherein the machine-readable storage medium further comprises instructions to determine a centroid of the robust contour, wherein the centroid is used to determine a representative value of a characteristic in the cluster of the plurality of spatial points.

* * * * *